US008848312B2

(12) United States Patent
Watanabe et al.

(10) Patent No.: US 8,848,312 B2
(45) Date of Patent: *Sep. 30, 2014

(54) DISK DRIVE DEVICE WITH HUB WITH THINNESS AND SUPPRESSED TORQUE DECREASE

(71) Applicant: Samsung Electro-Mechnics Japan Advanced Technology Co., Ltd., Shizuoka (JP)

(72) Inventors: Takanori Watanabe, Shizuoka (JP); Hiroshi Iwai, Shizuoka (JP); Tomoyuki Tashiro, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/011,301

(22) Filed: Aug. 27, 2013

(65) Prior Publication Data
US 2013/0342935 A1 Dec. 26, 2013

Related U.S. Application Data

(62) Division of application No. 13/760,260, filed on Feb. 6, 2013, which is a division of application No. 13/530,433, filed on Jun. 22, 2012, now Pat. No. 8,395,862, which is a division of application No. 12/545,751, filed on Aug. 21, 2009, now Pat. No. 8,213,114.

(51) Int. Cl.
G11B 17/02 (2006.01)
G11B 19/20 (2006.01)

(52) U.S. Cl.
CPC ........ G11B 19/2045 (2013.01); G11B 19/2009 (2013.01)
USPC ........................................................ 360/99.08

(58) Field of Classification Search
USPC .................................. 360/99.08, 99.04, 98.07
See application file for complete search history.

(56) References Cited

U.S. PATENT DOCUMENTS

RE38,772 E 8/2005 Elsasser et al.
6,943,983 B2 9/2005 Komatsu et al.
(Continued)

FOREIGN PATENT DOCUMENTS

JP H06-245459 A 9/1994
JP 06-074064 A 10/1994
(Continued)

OTHER PUBLICATIONS

Partial English Computer translation for JP 2007-198555; 14 pages.*

(Continued)

Primary Examiner — Brian Miller
(74) Attorney, Agent, or Firm — Blank Rome LLP

(57) ABSTRACT

The disk drive device includes a base member, a hub, a bearing unit which is arranged on the base member and which rotatably supports the hub, and a spindle drive unit which drives the hub to rotate. The spindle drive unit includes a stator core having a salient pole, a coil wound around the salient pole and a magnet opposed to the salient pole. The base member includes a wire hole through which a drawing line of a wire for forming the coil passes, and a concavity formed at a bottom surface of the base member at least partly arranged radially outside the outer diameter portion of the magnet. The drawing line passes through the wire hole and is arranged along the bottom surface of the base member and connected to a wiring member at the concavity beyond the outer diameter portion of the magnet.

18 Claims, 6 Drawing Sheets

(56) References Cited

U.S. PATENT DOCUMENTS

| | | |
|---|---|---|
| 7,518,823 B2 | 4/2009 | Albrecht et al. |
| 8,120,217 B2 | 2/2012 | Tawata et al. |
| 8,213,114 B2 | 7/2012 | Watanabe et al. |
| 8,345,379 B2 | 1/2013 | Maeda et al. |
| 8,363,353 B2 | 1/2013 | Yawata |
| 8,395,862 B2 | 3/2013 | Watanabe et al. |
| 2011/0255191 A1 | 10/2011 | Watanabe et al. |
| 2013/0038964 A1 | 2/2013 | Garbarino et al. |

FOREIGN PATENT DOCUMENTS

| | | |
|---|---|---|
| JP | H07-222386 | 8/1995 |
| JP | 07-298533 | 11/1995 |
| JP | 09-093897 A | 4/1997 |
| JP | 11-136917 | 5/1999 |
| JP | 06-245459 A | 9/2004 |
| JP | 2005-057892 | 3/2005 |
| JP | 2006074064 A | 3/2006 |
| JP | 2006245459 A | 9/2006 |
| JP | 2007-198555 | 8/2007 |
| JP | 2008182830 A | 8/2008 |
| JP | 2008-312300 | 12/2008 |
| JP | 2009093897 A | 4/2009 |

OTHER PUBLICATIONS

Japanese Office Action, Aug. 21, 2012, 8 pages.
Japanese Office Action issued in related JP 2012-229599 on Feb. 7, 2014 (with English translation).

* cited by examiner

DISK DRIVE DEVICE WITH HUB WITH THINNESS AND SUPPRESSED TORQUE DECREASE

CROSS-REFERENCE TO RELATED APPLICATIONS

This is a Divisional application based on U.S. Ser. No. 13/760,260, filed on Feb. 6, 2013, which is based on U.S. Ser. No. 13/530,433, filed on Jun. 22, 2012, U.S. Pat. No. 8,395,862, issued Mar. 12, 2013, which is a Divisional of U.S. Ser. No. 12/545,751, filed on Aug. 21, 2009, U.S. Pat. No. 8,213,114, issued Jul. 3, 2012, the entire contents of which is incorporated herein by reference.

BACKGROUND OF THE INVENTION

1. Field of the Invention

The present invention relates to a disk drive device with a reduced height.

2. Description of the Related Art

Recently, a disk drive device such as an HDD has been improved in bearing stiffness by incorporating a dynamic pressure fluid bearing unit. There is a case that such a disk drive device having the dynamic pressure fluid bearing unit is mounted on a small portable apparatus. A portable apparatus is desired to be further thinned and lightened. Therefore, the disk drive device which is mounted on the portable apparatus is desired to be further thinned and lightened.

For example, patent document 1 has disclosed a disk drive device having a dynamic pressure fluid bearing unit with a first radial dynamic pressure groove of which the formed width in the axial direction is narrower than that of a second radial dynamic pressure groove.

Patent document 1: Japanese Patent Application Laid-Open No. 2007-198555

In order to thin a disk drive device, it is necessary to thin a spindle drive unit.

SUMMARY OF THE INVENTION

The present invention is devised in view of the abovementioned situation, and a purpose thereof is to provide a disk drive device with a reduced height.

In view of the above mentioned, a disk drive device according to an aspect of the present invention comprises: a base member; a hub; a bearing unit which is arranged on the base member and which rotatably supports the hub; and a spindle drive unit, which drives the hub to rotate, wherein the spindle drive unit includes a stator core having a salient pole, a coil wound around the salient pole, and a magnet that is opposite to the salient pole, wherein the hub is formed of a magnetic material, wherein the base member includes a wire hole through which a wire for forming the coil passes, and a concavity that is formed at a bottom surface of the base member at a position that is arranged radially outside of the outer diameter of the magnet, wherein the wire passes through the wire hole and is arranged along the bottom face of the base member to a wiring member to which the wire is connected at the concavity at the bottom surface of the base member, and wherein the hub is provided with a fitting portion located radially outside of a space in the bearing unit for storing lubricant and configured to be fitted to the end of the clamper that defines the central hole.

According to this aspect, the diameter of the magnet can be larger than the inner circumference of the recording disk by setting, a slim disk drive device can be produced even in the presence of both the wiring member and the wire, by connecting the wire to the wiring member at the lowered portion, so that the thickness of the disk drive device can be reduced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DETAILED DESCRIPTION OF THE INVENTION

The invention will now be described by reference to the preferred embodiments. This does not intend to limit the scope of the present invention, but to exemplify the invention.

In the following, the same numeral is given to the same or a similar structural element or member, which is illustrated in each of the drawings, and redundant description will not be repeated. For ease of understanding, members of each of the drawings are appropriately enlarged or reduced in scale Here, in the following description, the terms "lower" and the "upper" in regard to the drawings are respectively expressed as the "bottom" and the "top", for convenience.

Figure 1A:
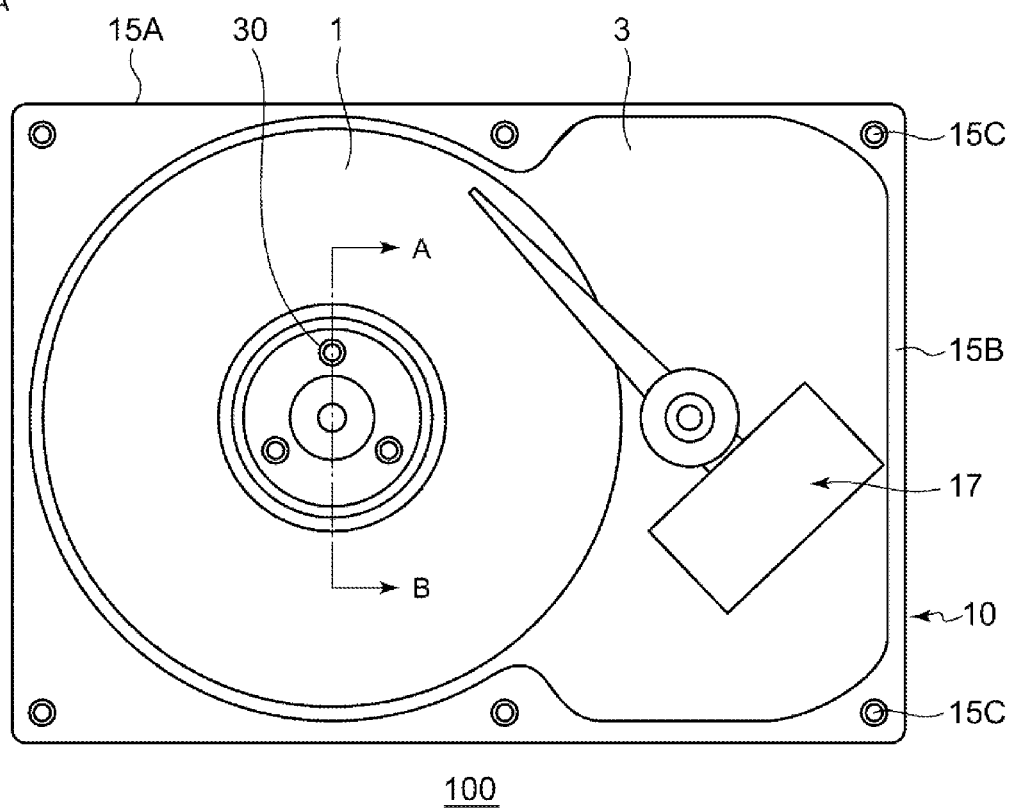
FIG. 1A is a view illustrating a disk drive device according to an embodiment.
Figure 1B:
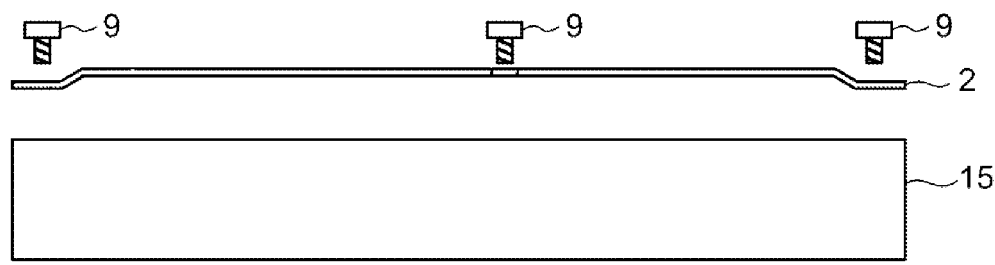
FIG. 1B is a view illustrating the disk drive device according to the present embodiment.
Figure 2:
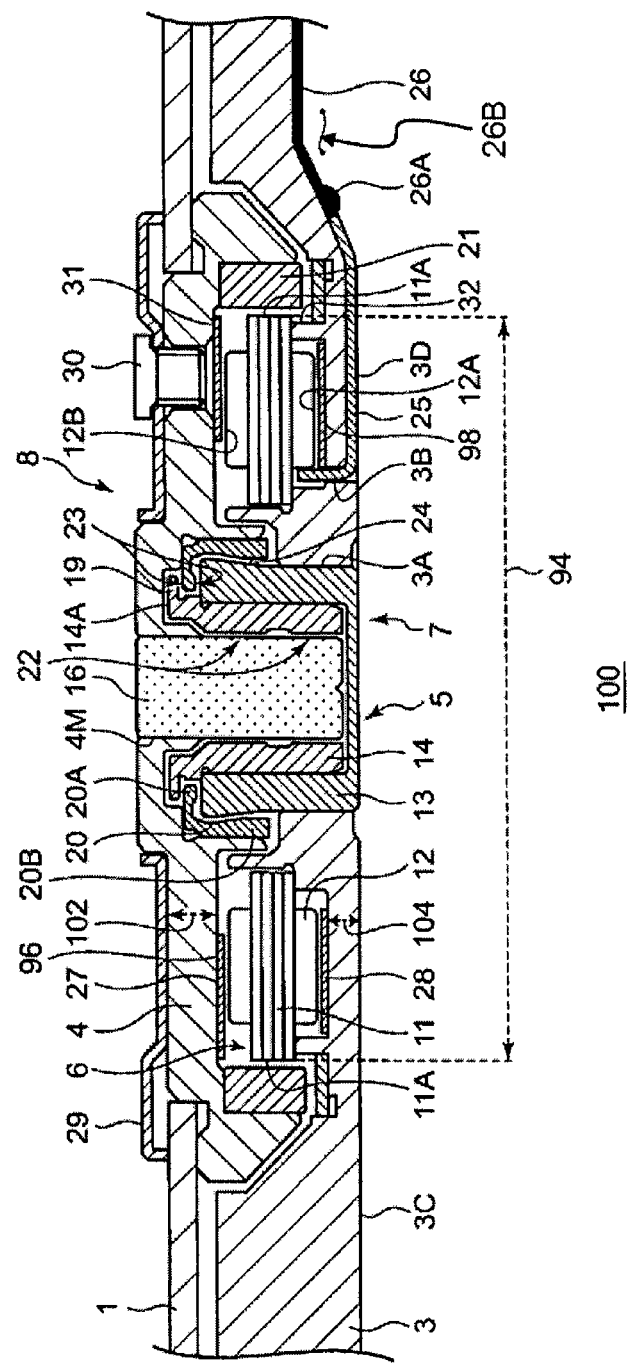
FIG. 2 is a sectional view of a part of the disk drive device according to the present embodiment.
Figure 3:
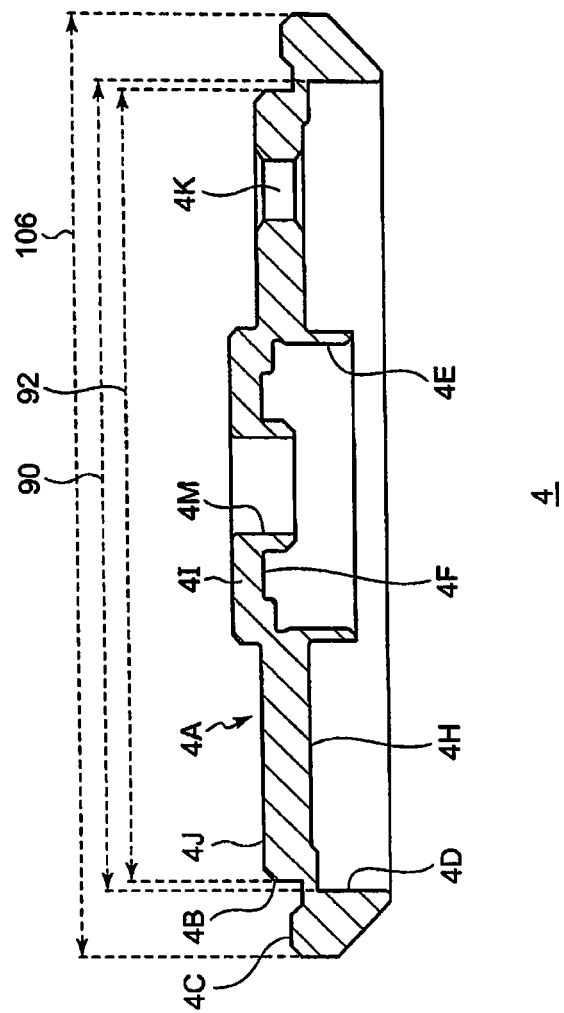
FIG. 3 is a sectional view of a hub according to the present embodiment.

FIGS. 1A and 1B illustrate a disk drive device 100 according to an embodiment. FIG. 1A is a top view of the disk drive device 100 and FIG. 1B is a side view of the disk drive device 100. Here, FIG. 1A illustrates a state where a top cover 2 is removed. Further, FIG. 2 is a sectional view of a part of the disk drive device 100 according to the present embodiment. Furthermore, FIG. 3 is a sectional view of a hub 4 according to the present embodiment. Each of FIG. 2 and FIG. 3 is the view sectioned at line A-B in FIG. 1A.

The disk drive device 100 includes a chassis 10, which has a base member 3 and a looped circumference wall portion 15, the hub 4 to which a ring-shaped recording disk 1 is mounted, a bearing unit 5, which is arranged on the base member 3 so as to rotatably support the hub 4, a spindle drive unit 6, which drives the hub 4 to rotate, a head drive unit 17, the top cover 2, and a screw 9. Further, the disk drive device 100 includes a fixed body portion 7 configured with members that do not rotate and a rotating body portion 8 configured with members that rotate. The fixed body portion 7 and the rotating body portion 8 include the bearing unit 5, which supports the hub 4 in order to be relatively rotatable, and the spindle drive unit 6, which drives the hub 4 to rotate.

The chassis 10 includes the base member 3, which is a plane area of a hollowed portion, and the looped circumference wall portion 15, which is formed in a wall shape at the outer circumference of the base member 3. The base member 3 has a bearing hole 3A into which a housing 13, a sleeve 14, and a shaft 16 are inserted. The outer circumference surface of the looped circumference wall portion 15 is rectangularly formed. The inner circumference surface of the looped circumference wall portion 15 is formed by connecting a circular portion 15A for surrounding the recording disk 1 and a rectangular portion 15B for surrounding an area to which the head drive unit 17 is mounted. The looped circumference wall portion 15 functions as a support member of the disk drive device 100 for supporting in the rotation axial direction of the shaft 16. On the other hand, the base member 3 functions as a support member of the disk drive device 100 for supporting in the direction perpendicular to the rotation axial direction of the shaft 16.

The top cover 2, which is illustrated in FIG. 1B, is arranged and fixed at the upper end of the looped circumference wall portion 15 by screwing the screw 9 into a screw hole 15C, which is formed at the upper end surface side of the looped circumference wall portion 15. A clean air chamber is formed by being enclosed with the chassis 10 and the top cover 2 for covering the hollow portion of the chassis 10. The clean air chamber is filled with clean air from which particles are removed. The recording disk 1, which is a magnetic recording medium, the rotating body portion 8, and the head drive unit 17 are arranged in the clean air chamber.

As shown in FIG. 2, the bearing unit 5 is arranged on the base member 3 and includes the shaft 16, the sleeve 14, the housing 13, an overhanging member 19, and a descent portion 20. Further, the bearing unit 5 includes a radial dynamic pressure groove 22, a thrust dynamic pressure groove 23, and a capillary seal portion 24.

The shaft 16 functions as the rotation axis. The upper end of the shaft 16 is fixed to a shaft hole 4M, which is formed at the center of the hub 4. The shaft 16 is inserted into the sleeve 14. The sleeve 14, which is approximately cylindrical, is inserted into the housing 13. A part of the surface of the outer circumference of the sleeve 14 is fixed to the surface of the inner circumference of the housing 13 by bonding and the like. The overhanging member 19, which overhangs outward in the radial direction, is fixed to an opening end surface 14A at the upper side of the sleeve 14. The overhanging member 19 restricts the movement of the hub 4 in the axial direction in cooperation with the descent portion 20. Further, the overhanging member 19 and the descent portion 20 prevent the rotating body portion 8 from coming out of place.

The housing 13 is in the form of a cup, with a bottom, such that a cylinder portion and a bottom portion are integrally formed. A part of the surface of the outer circumference of the housing 13 is fixed to a bearing hole 3A, which positions is positioned approximately at the center of the base member 3. The bottom portion of the housing 13 is formed at the lower end of the housing 13 for sealing so that lubricant does not leak to the outside of the housing 13.

The radial dynamic pressure groove 22 and the thrust dynamic pressure groove 23 function as the bearing to rotatably support the hub 4. Two herringbone-shaped radial dynamic pressure grooves 22 are formed to be vertically apart, at least at either of the inner circumferential surface of the sleeve 14 or the outer circumferential surface of the shaft 16. Further, the thrust dynamic pressure grooves 23, which are herringbone-shaped or spiral-shaped, are formed at both a surface of the descent portion 20 opposed to the surface of the opening end of the housing 13 and the upper surface of the descent portion 20 opposed to a lower surface of the overhanging member 19. Here, the thrust dynamic pressure grooves 23 may be formed at least at either the opening end surface 14A of the sleeve 14 or the lower end surface 4F of the hub 4, which is opposed to the opening end surface 14A.

When the shaft 16 is rotated, a radial dynamic pressure is generated at the lubricant by the radial dynamic pressure groove 22, so that the rotating body portion 8 is supported in the radial direction. Further, when the descent portion 20 is rotated, a thrust dynamic pressure is generated at the lubricant by the thrust dynamic pressure groove 23, so that the rotating body portion 8 is supported in the axial thrust direction.

The capillary seal portion 24 is formed with the inner circumference surface of a cylinder portion of the descent portion 20 and the outer circumference surface of the housing 13 so that the gap between the inner circumference surface of the descent portion 20 and the outer circumference surface of the housing 13 gradually becomes larger toward the opening end at the lower side of the descent portion. The lubricant such as oil is infused to a space defined by the radial dynamic pressure groove 22 and the opposing surface thereto, the thrust dynamic pressure groove 23 and the opposing surface thereto, and the capillary seal portion 24. The boundary liquid level at which the lubricant contacts outside air is set at some mid-part of the capillary seal portion 24. The capillary seal portion 24 prevents leaking of the lubricant with capillarity.

Figure 4:
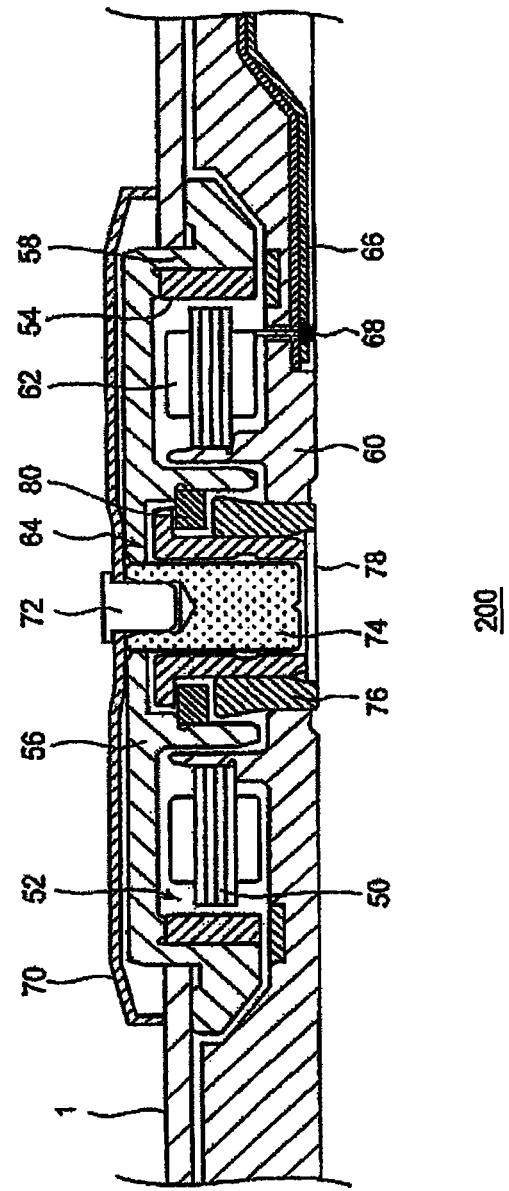
FIG. 4 is a sectional view of a part of a disk drive device according to the related art.

The spindle drive unit 6 includes a stator core 11 that is fixed to the base member 3, a three-phase coil 12, which is wound around a salient pole of the stator core 11, and an approximately cylindrical magnet 21, which is fixed at an interior cylinder portion 4D of the hub 4, as seen in FIG. 4.

The stator core 11 includes a circular portion and nine salient poles that are extended in the radial direction therefrom. The stator core 11 is formed by performing insulation coating such as electro-deposition coating and powder coating on the surface thereof after a plurality of magnetic plates such as ferrosilicon plates are laminated. The magnet 21 is formed of rare-earth material such as Nd—Fe—B (neodymium-ferrum-boron), for example. Rustproofing such as electro-deposition coating and spray coating is performed on the surface of the magnet 21. Further, for example, the magnet 21 has driving magnetic poles of twelve poles along the circumferential direction of a portion of the inner circumference of the magnet 21. The magnet 21 opposes to distal ends 11A of the salient poles of the stator core.

For the coil 12, a wire 25 is wound a predetermined number of times around the salient pole of the stator core 11 from the lower side of the salient pole, and then, is wound around the adjacent salient pole of the stator core 11 from the upper side of the salient pole. After the wire 25 is continuously wound a predetermined number of times around the salient poles of the stator core 11 in this manner, the wound end of the wire 25 is drawn to the lower side of the salient pole of the stator core 11. Subsequently, the wound end of the wire 25 is drawn to the opposite side of the base member 3 through a wire hole 3B, which is disposed at the base member 3, and then, electrically connected to a wiring member 26 which is arranged at the lower surface of the base member 3 in a concavity 26B. The wound end of the drawn wire 25 is fixed with a bond so as not to be released. Such fixing prevents the wire 25 from disconnection due to large-amplitude vibration caused by resonance during ultra-sonic cleaning. When the coil 12 is powered with a three-phase current of an approximate sine-wave by a predetermined drive circuit via the wiring member 26, the coil 12 generates a magnetic field for rotation at the salient poles of the stator core 11. A rotational driving force is generated by the interaction between the driving poles of the magnet 21 and the magnetic field for rotation so that the rotating body portion 8 is rotated. Namely, the spindle drive unit 6 drives the rotating body portion 8 to rotate.

The fixed body portion 7 is configured to include the chassis 10 of which section is an approximate hollow shape, the stator core 11, the coil 12, the housing 13, and the sleeve 14. Further, the rotating body portion 8 is configured to include the approximately pan-shaped hub 4 to which the recording disk 1 is mounted, the shaft 16 and the magnet 21.

In the following, the hub 4 is specifically described with reference to FIG. 3. The hub 4 is formed of magnetic material such as SUS430F which has soft magnetism. It is preferable to form the whole hub 4 with magnetic material in view of generating an effect of magnetic shield. The hub 4 is formed by machining, such as by pressing and cutting so as to create the predetermined shape of being approximately pan-shaped. For example, stainless steel DHS1 manufactured by Daido Steel Co. Ltd. is preferable in view of resources expended. In addition, stainless steel DHS2 is further preferable in view of its excellent corrosion resistance.

The shaft hole 4M is formed at the center of the hub 4 and a circular center portion 4I is formed around the shaft hole 4M. The shaft hole 4M is formed so that the dimension thereof in the axial direction is larger than the dimension in the axial direction of a part of the center portion 4I opposing to the upper end surface of the sleeve 14. A part of the outer circumference of the shaft hole 4M is projected downward. Accordingly, connecting surface between the hub 4 which is thinned and the shaft 16 is ensured.

A circular stepped of two levels is formed at the upper end surface 4A of the hub 4 and the center portion 4I is located at the top level. A recess portion 4J which is lowered downward by one step from the center portion 4I is formed at the top end surface 4A to be ring-shaped. A plurality of threaded holes 4K are disposed at the upper surface of the recess portion 4J at the same circular intervals. A clamper 29 is disposed on the recess portion 4J. Then, the circular step between the center portion 4I and the recess portion 4J is fitted to a center hole of the clamper 29. The clamper 29 is fixed by screwing screws 30 to the threaded holes 4K.

A circular exterior cylinder portion 4B is formed as a stepped portion lowered from the periphery of the recess portion 4J. A annular extension portion 4C is formed to extend outward in the radial direction from the lower end of the periphery of the exterior cylinder portion 4B. The inner circumference of the center hole of the recording disk 1 is engaged with the exterior cylinder portion 4B of the hub 4 so that the recording disk 1 is mounted on the upper surface of the annular extension portion 4C. The annular extension portion 4C sags to the base member 3 side. The outer circumference of the magnet 21 is fixed to the interior cylinder portion 4D. The annular extension portion 4C, which is located in an area outside the outer circumference of the magnet 21 in the radial direction, functions as a back yoke for the magnet 21.

A circular projecting portion 4E, which projects in the direction toward the base member 3 between the housing 13 and the stator core 11, is formed at the lower surface of the hub 4. The circular descent portion 20 is fixed to the inner circumference surface of the circular projecting portion 4E of the hub 4 through bonding.

A lower end surface 4F of the hub 4 opposing an opening end surface 14A of the sleeve 14 is located at the back surface of the center portion 4I. A portion 4H of the hub 4 opposing the coil 12 is located at the back surface of the recess portion 4J.

Here, a problem with respect to the related art, which is recognized by the present inventor, is described based on the structure according to FIG. 4. FIG. 4 is a sectional view of a part of a disk drive device 200 of the related art. When the disk drive device 200 of the related art is thinned, a spindle unit 52 such as a stator core 50 becomes thin accordingly. When the spindle unit 52 becomes thin, the rotation becomes unstable due to torque decrease. When the rotation becomes unstable, the unstableness may impair normal read/write operation of magnetic data, at worst.

There may be a solution for recapturing a decrease in torque by using a magnet 54 with a larger diameter. However, with the configuration that the recording disk 1 is located at an area on the extension of the outer circumference of the magnet 54, a back yoke portion 58 of the hub 56 sandwiched by the inner circumference of the recording disk 1, and the outer circumference of the magnet 54 becomes thin in accordance with increase of the diameter of the magnet 54. The back yoke portion 58 constitutes a part of a magnetic circuit through which magnetic flux departing from the outer circumference of the magnet 54. Thus, when the back yoke portion 58 becomes thin, magnetic saturation occurs. When the magnetic saturation occurs, the magnetic flux is hardly increased even though the magnetic field is strengthened. Accordingly, the torque cannot be increased since the increase of the magnetic flux contributing to the torque is slight. On the other hand, the magnetic flux leaking to the recording disk 1 side is extremely increased. Therefore, with the configuration that the recording disk 1 is located at the area on the extension of the outer circumference of the magnet 54, there is a possibility that normal read/write operation of magnetic data is impaired by the leaked magnetic flux. This has been an inhibitor of thinning the disk drive device 200. Further, even in the case that the back yoke portion 58 is thickened in the related art, increase of the torque is not expected since the magnet 54 has to be decreased in size accordingly.

In view of the abovementioned problem, the recording disk 1 according to the present embodiment is arranged at a position to be apart upward from the magnet 21 in the axial direction being away from the area on the extension of the outer circumference of the magnet 21 in the radial direction, as illustrated in FIG. 2. With this configuration, the magnetic flux leaking to the recording disk 1 side can be decreased. Then, the interior cylinder portion 4D of the hub 4 is configured so that the diameter 90 thereof is larger than the diameter 92 of the exterior cylinder portion 4B of the hub 4, as seen in FIG. 3. As a result, it becomes possible to enlarge the outer circumference of the magnet 21 so that the torque is increased due to increase of the magnetic flux amount of the magnetic poles for driving. Accordingly, the configuration is preferable for the thinned disk drive device 100. Further, since the recording disk 1 is arranged at the upper position in the axial direction away from the area on the extension of the outer circumference of the magnet 21 in the radial direction, the back yoke of the hub 4 can be configured to be sufficiently thick in the radial direction. As a result, even in the case that the magnet 21 of which the energy product is larger is used, the leak in magnetic flux can be suppressed and the torque can be increased.

The diameter 94 of a circle connecting the ends 11A of the salient poles of the stator core 11 may be set to be 80% or more of the diameter 92 of the exterior cylinder portion 4B of the hub 4. By configuring the stator core 11 to be large, as mentioned above, more winding can be performed for the coil 12 so that torque increase is expected. Here, when the diameter 94 of the circle connecting the salient ends 11A of the salient poles of the stator core 11 exceeds 100% of the diameter 92 of the exterior cylinder portion 4B, the leaked magnetic flux of the magnet 21 may affect the recording disk 1 and may impair the normal read/write operation of magnetic data. Therefore, the diameter of the circle connecting the salient ends 11A of the salient poles of the stator core 11 is within a range of 80% to 100% of the diameter 92 of the exterior cylinder portion 4B.

The base member 3 has a wire hole 3B through which the wire 25 for forming the coil 12 is inserted. A drawing line of the wire 25 which forms the coil 12 is introduced to exit through the wire hole 3B to the back surface 3C of the upper surface of the base member 3 on which the bearing unit 5 is arranged. In the related art of FIG. 4, the drawing line of the wire is connected to a wiring member 66 by soldering at a position strictly below the position where the drawing line is drawn from the coil 12. The thickness of the wiring member 66 and the height of the connection portion 68 at the position strictly below the coil 62 are to be a barrier of thinning the spindle drive unit 5.

Next, in the disk drive device 200 of the related art which is illustrated in FIG. 4, a cylinder portion 76 and a bottom portion 78 of the housing is fixed by bonding as separate members. In this case, when the disk drive device is thinned, the bonding part also becomes thin. When the bonding part becomes thin, the connection strength is decreased. Accordingly, there is a possibility of disconnection due to impact.

Here, there is a case that the base member 3 is formed of metal such as aluminum. In this case, there is a possibility that the wire 25, which is drawn to the lower surface 3C of the base member 3, may be electrically short-circuited by directly contacting to the base member 3. In order to cope with this problem, a channel portion 3D, which introduces the wire to exit through the wire hole 3B for connecting to the wiring member 26, is disposed at the back surface 3C of the surface of the base member 3 to which the bearing unit 5 is disposed. The channel portion 3D is insulation treated. As a result, the problem that the wire 25 is electrical short-circuited with the base member 3 is relieved. Further, by combining the positioning of the abovementioned connection portion 26A with the configuration of positioning outside the magnet 21 in the radial direction, in concavity 26B, the spindle drive unit 6 can be thinned by the amount based on the thickness of the wiring member 66 and the height of the connection portion 68 of the related art which is illustrated in FIG. 4. Here, for example, cationic electro-deposition coating (hereinafter, called ED coating) onto the base member 3, which is molded with aluminum die-casting, is preferable as the isolation process in view of less pin holes.

Here, when the disk drive device 100 is configured to be further thinned, the coil 12, which is wound around the salient poles and the lower surface of the hub 4, becomes extremely close. In this case, the possibility that the coil 12 contacts the rotating hub 4 is increased. When the coil 12 contacts the hub 4, an electrical short-circuit may occur. In order to cope with this problem, the coil 12 is leveled so that the surface opposing to the hub 4 and the surface opposing to the base member 3 are to be level.

Figure 5A:
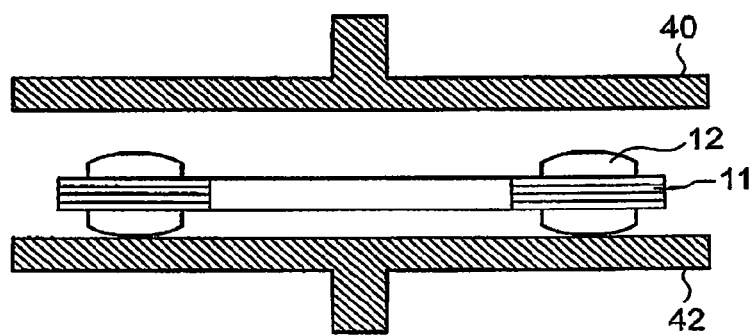
FIG. 5A is a view illustrating a method of forming a coil according to the present embodiment.
Figure 5B:
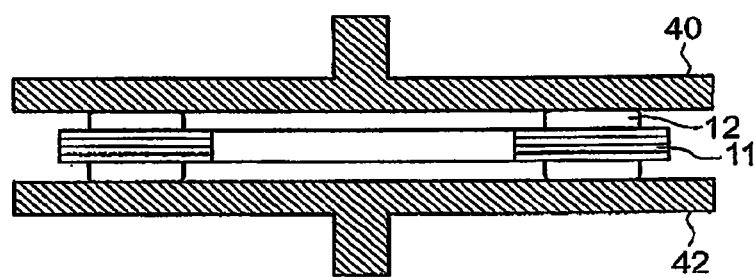
FIG. 5B is a view illustrating the method of forming a coil according to the present embodiment.
Figure 5C:
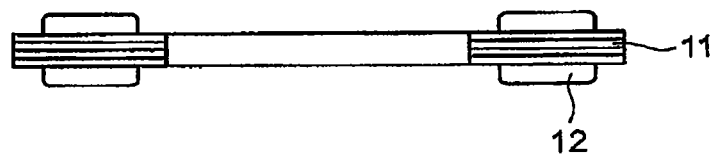
FIG. 5C is a view illustrating the method of forming a coil according to the present embodiment.

FIGS. 5A to 5C illustrate a forming method of the coil 12 according to the present embodiment. FIG. 5A illustrates the coil 12 before forming, FIG. 5B illustrates the coil 12 during pressing, and FIG. 5C illustrates the coil 12 after pressing. As illustrated in the drawings, the coil 12 is formed by being pressed between a first pressing die 40 and a second pressing die 42 after the wire 25 is wound around the salient poles of the stator core 11. The pressing surfaces of the first pressing die 40 and the second pressing die 42 are flat. By forming the coil 12 to be flat with pressing, the dimension of the coil 12 in the axial direction is stabilized so that the possibility that the coil 12 comes in contact with the rotating hub 4 can be decreased. Accordingly, the dimension of the coil 12 in the axial direction can be thinned.

Further, in order to cope with the contacting problem of the coil 12 to the rotating hub 4, the flattening ratio of the wire 25, which forms the leveled coil 12, may be 90% or less. The flattening ratio of the wire 25 is expressed by a percentage of the dimension "b" of the section of the single wire 25 in the axial direction against the dimension "a" in the radial direction. Here, the flattening ratio of the wire 25 of the coil 12 is defined at a part of which the flattening ratio is the lowest. The equation thereof is as follows:

The flattening ratio of the wire $25 = (b/a) \times 100$

When the coil 12 is formed with pressing so as to limit the dimension of the coil 12 in the axial direction, the part of the wire 25 of which the flattening ratio becomes lowest is the part that is thickest in the axial direction. As a result, the possibility of contact of the coil 12 to the rotating hub 4 is further decreased.

Furthermore, in order to cope with the contacting problem of the coil 12 to the rotating hub 4, it is also possible to perform the insulation treatment on the surface of the hub 4 opposing to the coil 12. As a result, the possibility of the electrical short-circuiting, which causes a malfunction, is decreased. For example, a circular film 27 that is made of Polyethylene terephthalate (PET) may be stuck with double-faced tape to the surface 96 of the hub 4 opposed to the surface 12A of the coil 12. This method is preferable in view of easy operation.

Further, there may be a problem that an electrical short-circuit occurs due to the coil 12 coming in contact with the base member 3. In order to cope with this problem, it is also possible to perform an insulation treatment on the surface 98 of the base member 3 opposed to the surface 12B of the coil 12. As a result, the possibility that the coil 12 comes in contact with the base member 3 to cause an electrical short-circuit is decreased. For example, it is also possible to perform the ED coating on the base member 3 which is molded with aluminum die-casting as the insulation treatment. This is preferable in view of less pin holes. Further, a circular film 28, which is made of PET, may be stuck with double-faced tape to the surface of the base member 3 opposing to the coil 12. This method is preferable in view of easy operation.

Figure 6:
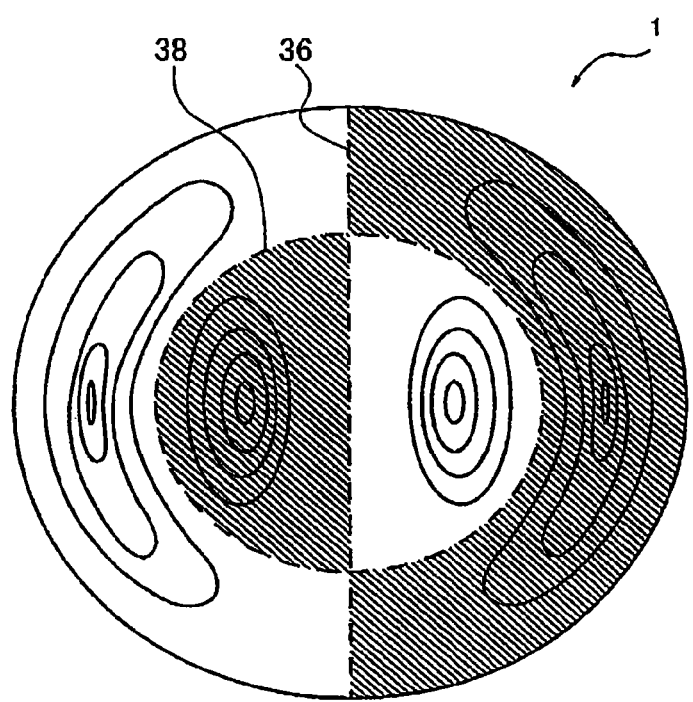
FIG. 6 is a schematic view schematically illustrating behavior of momentary vibration of a recording disk surface.

By the way, in the case that the disk drive device 100 is thinned, stiffness is decreased and rocking-mode resonance frequency is decreased when the portion 4H of the hub 4 opposed to the coil 12 in the axial direction is shortened. Here, the rocking-mode resonance is described with reference to FIG. 6. FIG. 6 is a schematic view, which schematically illustrates behavior of momentary vibration of a recording disk 1 surface. In FIG. 6, dashed lines illustrate a nodal diameter 36 and a nodal circle 38 at the vicinity of toque-ripple frequency. The area with hatching indicates that the vibration phase thereof at the vicinity of the torque-ripple frequency is reverse to that of the area without hatching. Solid lines are contour lines of vibration displacement at the vicinity of the torque-ripple frequency.

The resonance of the disk drive device 100 during non-rotating has been examined in the state that the recording disk 1 is mounted in the disk drive device 100. As a result, the rocking-mode resonance with the single nodal diameter 36 and the nodal circle 38 as an intermediate portion was observed in the recording disk 1 at the vicinity of the torque-ripple frequency. Through the study of the present inventor, the main factors that determine the frequency of the rocking-mode resonance are discovered to be the stiffness of the bearing, the stiffness of the connecting portion between the hub 4 and the shaft 16, the stiffness of the connecting portion between the recording disk 1 and the hub 4, the stiffness of the recording disk 1 itself, the lateral moment of inertia of the recording disk 1, and the lateral moment of inertia of the hub 4.

When the frequency of the rocking-mode resonance becomes low, there may be a case that large vibration occurs due to resonance with the variation of the drive torque. There may be a problem that such vibration causes a malfunction of normal read/write operation of magnetic data, at worst. In order to cope with this problem, the width 102 in the axial direction of the hub 4 opposed to the coil 12 may be larger than the width 104 in the axial direction of the base member 3 opposed to the coil 12. This is for the relative relation of dimensions of the base member 3 and the hub 4 in the axial direction in the case that the disk drive device 100 is thinned. As a result, the problem caused by decrease of the frequency of the rocking-mode resonance is relieved.

Next, in the disk drive device 200 of the related art, which is illustrated in FIG. 4, a center part of a clamper 70 is fixed at the center of the shaft 74 with a screw 72. Therefore, the center part of the hub 56 is to be thinned in the axial direction by the amount of the clamper 70 and the screw 72. When the center part of the hub 56 is thinned in the axial direction, the frequency of rocking-mode resonance becomes low. Accordingly, there may be a case that large vibration occurs due to the resonance with the variation of the drive torque.

In order to cope with this problem, in the disk drive device 100 according to the present embodiment, the hub 4 includes the recess portion 4J, which is formed on the surface of the hub 4 at the side to which the recording disk 1 is mounted, and the threaded hole 4K, which is formed at the recess portion 4J, as illustrated in FIG. 2 and FIG. 3. The clamper 29 is fixed to the threaded hole 4K with the screw 30. As a result, the problem caused by thinning the center portion 4I of the hub 4 in the axial direction is relieved. In addition, since the shaft 16 can be configured to be long, it is preferable because decrease of the bearing stiffness can be prevented.

Further, there may be a case that the dimension in the axial direction of the thread portion of the threaded hole 4K, which is formed at the hub 4, is insufficient. In order to cope with this problem, the threaded portion 4K is formed to penetrate in the axial direction. Further, a cover member 31 is disposed at the surface 96 of the hub 4 to which the threaded portion 4K is formed and which is opposed to the surface 12A of the coil 12. As a result, the problem that the dimension in the axial direction of the thread portion of the threaded hole 4K is insufficient is relieved. A variety of materials can be used for the cover member 31. For example, a PET film may be stuck with double-faced tape to the surface 98 of the base member 3 opposed to the surface 12B of the coil 12. This method is preferable in view of easy operation as well as functioning as the insulation treatment against the coil 12.

Next, in the disk drive device 200 of the related art, which is illustrated in FIG. 4, a cylinder portion 76 and a bottom portion 78 of the housing is fixed by bonding as separate members. In this case, when the disk drive device is thinned, the bonding part also becomes thin. When the bonding part becomes thin, the connection strength is decreased. Accordingly, there is a possibility of disconnection due to impact.

In order to cope with this problem, in the disk drive device 100 of the present embodiment, the housing 13 is in the form of a cup with a bottom such that a cylinder portion and a bottom portion are integrally formed, as illustrated in FIG. 2. As a result, the problem of disconnection between the cylinder portion and the bottom portion of the housing 13 is relieved even when the disk drive device 100 becomes thin.

Next, in the disk drive device 200 of the related art which is illustrated in FIG. 4, a circular member 80 is fixed by bonding to the inner circumference of a circular projecting portion of the hub 56. The doughnut-shaped circular member 80 is formed so that the dimension thereof in the axial direction is 1.2 mm or more for ensuring connection strength with the hub 56. When the disk drive device 200 becomes thin, the center portion of the hub 56 in the axial direction is to be thin by the amount of the circular member 80. When the center portion of the hub 56 in the axial direction becomes thin, the frequency of the rocking-mode resonance becomes low. Accordingly, there may be a case that large vibration occurs due to resonance with the variation of the drive torque.

In order to cope with this problem, the bearing unit 5 of the present embodiment includes the descent portion 20, which is rotated integrally with the hub 4, and the overhanging member 19, which is arranged so as to be nonrotatable at a position opposed to the descent portion 20 in the axial direction, as illustrated in FIG. 2. Further, it is also possible that the descent portion 20 restricts movement of the hub 4 in cooperation with the overhanging member 19 and the width in the axial direction of the descent portion 20 opposed to the overhanging member 19 is set to be 0.6 mm or less. Namely, the thickness of a disk portion 20A of the descent portion 20 is set to be 0.6 mm or less. As a result, in the case that the disk drive device 100 is thinned, the dimension of the center portion 4I of the hub 4 in the axial direction can be ensured. In addition, it is preferable that the dimension of the descent portion 20 is set to be 0.4 mm or less because the center portion 4I of the hub 4 can be further thickened in the axial direction.

Further, when the circular member 80 of FIG. 4 is thinned in the axial direction, there may be a problem of disconnection due to impact since the connection strength of the circular member 80 with the hub 56 is decreased. In order to cope with this problem, the descent portion 20 is formed by integrating the disk portion 20A, which is opposed to the overhanging member 19 in the axial direction, and a cylinder portion 20B, which is connected to the periphery portion of the disk portion 20A. With this configuration, the dimension in the axial direction for connecting to the circular projecting portion 4E can be sufficiently ensured. As a result, the problem of disconnection between the descent portion 20 and the hub 4 is relieved. For example, by setting the dimension of the cylinder portion 20B in the axial direction to be 2.0 mm or more, the connection strength with the hub 4 is sufficiently ensured. In addition, by setting the dimension of the disk portion 20A in the axial direction to be 0.4 mm or less thereafter, the dimension of the center portion 4I of the hub 4 can be configured to be thick in the axial direction.

There may be a problem that the machining of the descent portion 20 requires much expense in time. In order to cope with this problem, the descent portion 20 may be formed by the pressing of metal material. As a result, the problem of machining expense of the descent portion 20 in time can be relieved.

There may be a problem that the machining of the descent portion 20 requires much expense in time. In order to cope with this problem, the descent portion 20 may be formed by pressing of metal material. As a result, the problem of machining expense of the descent portion 20 in time can be relieved.

Further, the thrust dynamic pressure groove 23 may be formed at least at any surface of the disk portion 20A of the descent portion 20. Specifically, the thrust dynamic pressure groove 23 is formed at least either at the surface of the disk portion 20A opposed to the opening upper end surface of the housing 13 or the surface of the disk portion 20A opposed to the overhanging member 19. As a result, machining of the thrust dynamic pressure groove 23 becomes easy.

Here, in accordance with thinning of the disk drive device 100, the stator core 11 is configured to be thin. When the stator core 11 becomes thin, there is a possibility that the stator core 11 is attached to be inclined when the circular portion thereof is fitted to the base member 3. In order to cope with this problem, a stator core supporting member 32 is disposed between the salient pole of the stator core 11 and the base member 3. The stator core supporting member 32 is arranged to circularly project from the base member 3 toward the salient pole of the stator core 11 at which the coil 12 is not arranged. As a result, the stator core 11 is supported at the inner circumference and the outer circumference. Accordingly, the problem of the stator core 11 inclining by the thinning is relieved.

A part of the hub 4 covering the outer circumference of the magnet 21 performs a function of so-called back yoke. When the back yoke becomes thin, the magnetic resistance is increased. When the magnetic resistance is increased, the magnetic flux which is generated by the magnet 21 is decreased. When the magnetic flux is decreased, the torque is decreased. Accordingly, there may be a problem that a malfunction such as unstable rotation occurs. In order to cope with this problem, the hub 4 has the annular extension portion 4C, which extends outward, and the diameter 106 of the outer circumference end of the annular extension portion 4C is set to be larger than the diameter 90 of the interior cylinder portion 4D of the hub 4 by 4 mm or more. As a result, the thickness of the back yoke is sufficiently ensured and the problem caused by the torque decrease is relieved.

Here, when strong magnetic material is used for increasing the torque, there is a case that leaked magnetic flux is increased due to magnetic saturation in the back yoke. When the leaked magnetic flux is increased, a noise signal may be generated at a magnetic head for reading/writing data. When the noise signal is large, there is a possibility that normal operation of reading/writing of magnetic data is impaired. In order to cope with this problem, the saturation magnetic flux density of the annular extension portion 4C, which functions as the back yoke, is set to be 1 T (tesla) or more. With this configuration, the saturation magnetic flux density can be sufficiently ensured at the back yoke and the problem of increasing of the leaked magnetic flux is relieved. Here, when the saturation magnetic flux density of the hub 4 is set to be 1.2 T or more, stronger magnetic material can be used.

Here, there may be a demand to increase the torque so as to stabilize the rotation. In order to cope with this demand, the opposing clearance between the distal end 11A of the salient pole and the magnet 21 is set to be 0.4 mm or less. Namely, a gap where the distal end 11A of the salient pole and the magnet 21 face each other is set to be 0.4 mm or less. As a result, an air gap of the magnetic circuit becomes small and the magnetic flux amount of the magnet 21 is increased so that the torque is increased. The opposing clearance between the salient pole and the magnet 21 is preferable to be 0.4 mm or less in view of ensuring effect to increase the torque and to be 0.2 mm or more in view of preventing contact between the salient pole and the magnet 21.

Further, the maximum energy product of the magnet 21 according to the present embodiment may be set to be 10 megagauss-oersted (MGOe) or more. Accordingly, the magnetic flux amount of the magnet 21 is increased so that the torque is increased. The maximum energy product of the magnet 21 is preferably to be 10 MGOe or more in view of ensuring the torque increasing effect and to be 16 MGOe or less in view of easiness of magnetizing. Here, by combining the magnet 21 of the abovementioned maximum energy product with the back yoke of which saturation magnetic density is 1 T or more, the leaking of the magnetic flux from the back yoke can be suppressed even in the thinned disk drive device 100.

There is a demand of further thinning and lightening for the disk drive device 100 which is mounted on a portable apparatus. In order to cope with this demand, the inner diameter of the recording disk 1 is set to be 20 mm and the thickness of the disk drive device in the axial direction is set to be 7.5 mm or less. As a result, the portable apparatus can be configured to be thin and light. Further, it also contributes to resources saving.

As described above, the disk drive device 100 according to the present embodiment can stabilize the rotation of the recording disk 1 while achieving further thinning so as to be a preferable shape for a portable apparatus and the like.

Not limited to the abovementioned embodiments, the present invention is possible to be modified by various design changes based on knowledge of skilled persons. The configuration illustrated in each of the drawings is simply for describing an example and can be appropriately modified so that the similar effects are obtained as long as the similar functions can be achieved.

What is claimed is:

1. A disk drive device comprising:
a base member;
a hub;
a bearing unit which is arranged on the base member and which rotatably supports the hub; and
a spindle drive unit, which drives the hub to rotate, wherein the spindle drive unit includes a stator core having a salient pole, a coil wound around the salient pole, and a magnet configured with an outer diameter portion and a portion that is opposite to the salient pole,
wherein the hub is formed of a magnetic material,
wherein the base member includes a wire hole through which a drawing line of a wire for forming the coil passes, and a concavity that is formed at a bottom surface of the base member, at least a part of the concavity being arranged at a position that is radially outside of the outer diameter portion of the magnet,
wherein the drawing line of the wire passes through the wire hole and is arranged along the bottom surface of the base member to a wiring member to which the drawing line of the wire is connected at the concavity at the bottom surface of the base member at a position that is outside of the outer diameter portion of the magnet in the radial direction, and
wherein the wiring member is positioned radially outside the wire hole.

2. The disk drive device according to claim 1, wherein the spindle drive unit comprises a radial dynamic pressure bearing configured to otatably support the hub, and
wherein an axial region where the radial dynamic pressure bearing is located is radially aligned with an axial region where the stator core is located.

3. The disk drive device according to claim 2, wherein the coil located radially outside of the radial dynamic pressure bearing, and an axial region where the coil is located is radially aligned with the axial region where the radial dynamic pressure bearing is located.

4. The disk drive device according to claim 1, wherein a wound end of the drawing line of the wire is bonded to the bottom surface of the base member.

5. The disk drive device according to claim 2, further comprising a bottom portion configured to cover a lower end of the radial dynamic pressure bearing.

6. The disk drive device according to claim 1, wherein a surface of the coil opposed to the hub and a surface of the coil opposed to the base member are both level.

7. A disk drive device comprising:
a base member;
a hub;
a bearing unit which is arranged on the base member and which rotatably supports the hub; and
a spindle drive unit, which drives the hub to rotate,
wherein the spindle drive unit includes a stator core having a salient pole, a coil wound around the salient pole, and a magnet configured with an outer diameter portion and a portion that is opposite to the salient pole,
wherein the hub is formed of a magnetic material,
wherein the base member includes a wire hole through which a drawing line of a wire for forming the coil passes, and a concavity that is formed at a bottom surface of the base member, at least a part of the concavity being arranged at a position that is radially outside of the outer diameter portion of the magnet,
wherein the drawing line of the wire passes through the wire hole and is arranged along the bottom surface of the base member to a wiring member to which the drawing line of the wire is connected at the concavity at the bottom surface of the base member at a position that is outside of the outer diameter portion of the magnet in the radial direction,
wherein the spindle drive unit comprises a radial dynamic pressure bearing configured to rotatably support the hub, and
wherein an axial region where the radial dynamic pressure bearing is located is radially aligned with an axial region where the stator core is located.

8. The disk drive device according to claim 7, wherein the coil is located radially outside of the radial dynamic pressure bearing, and the axial region where the coil is located is radially aligned with an axial region where the radial dynamic pressure bearing is located.

9. The disk drive device according to claim 7, wherein a wound end of the drawing line of the wire is bonded to the bottom surface of the base member.

10. The disk drive device according to claim 7, further comprising a bottom portion configured to cover a lower end of the radial dynamic pressure bearing.

11. The disk drive device according to claim 7, wherein the bottom surface of the base member is provided with a groove portion in which the drawing line of the wire is introduced to exit through the wire hole for connection to the wiring member, and the groove portion is insulation treated.

12. The disk drive device according to claim 7, wherein a surface of the coil opposed to the hub and a surface of the coil opposed to the base member are both level.

13. A disk drive device comprising:
a base member;
a hub on which a recording disk is mounted;
a bearing unit which is arranged on the base member and which rotatably supports the hub; and
a spindle drive unit, which drives the hub to rotate, wherein the spindle drive unit includes a stator core having a salient pole, a coil wound around the salient pole, and a magnet configured with an outer diameter portion and a portion that is opposite to the salient pole,
wherein the hub is formed of a magnetic material,
wherein the base member includes a looped circumference wall portion surrounding the recording disk, a wire hole through which a drawing line of a wire for forming the coil passes, and a concavity that is formed at a bottom surface of the base member, at least a part of the concavity being arranged at a position that is radially outside of the outer diameter portion of the magnet, and
wherein the drawing line of the wire passes through the wire hole and is arranged along the bottom surface of the base member to a wiring member to which the drawing line of the wire is connected at the concavity at the bottom surface of the base member at a position that is outside of the outer diameter portion of the magnet in the radial direction.

14. The disk drive device according to claim 13, wherein the base member is arranged a head drive unit.

15. The disk drive device according to claim 13, wherein the wiring member is positioned radially outside the wire hole.

16. The disk drive device according to claim 13, wherein the spindle drive unit comprises a radial dynamic pressure bearing configured to rotatably support the hub, and
wherein an axial region where the radial dynamic pressure bearing is located is radially aligned with an axial region where the stator core is located.

17. The disk drive device according to claim 13, wherein a wound end Of the drawing line of the wire is bonded to the bottom surface of the base member.

18. The disk drive device according to claim 13, wherein the bottom surface of the base member is provided with a channel portion in which the drawing line of the wire is introduced to exit through the wire hole for connection to the wiring member, and the channel portion is insulation treated.

* * * * *